(12) United States Patent
Su et al.

(10) Patent No.: US 11,947,205 B2
(45) Date of Patent: Apr. 2, 2024

(54) FLEXIBLE DISPLAY COVER PLATE, DISPLAY PANEL, AND DISPLAY APPARATUS

(71) Applicant: Huawei Technologies Co., Ltd., Shenzhen (CN)

(72) Inventors: Zhaoliang Su, Dongguan (CN); Chenxin Ouyang, Dongguan (CN); Wangchun Lyu, Dongguan (CN); Peiqiong Shen, Shenzhen (CN); Qiuming Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 489 days.

(21) Appl. No.: 17/137,053

(22) Filed: Dec. 29, 2020

(65) Prior Publication Data

US 2021/0120691 A1    Apr. 22, 2021

Related U.S. Application Data

(63) Continuation of application No. PCT/CN2019/116399, filed on Nov. 7, 2019.

(30) Foreign Application Priority Data

Feb. 20, 2019    (CN) .......................... 201910126218.4

(51) Int. Cl.
*G02F 1/1333* (2006.01)
*G06F 1/16* (2006.01)
*H04M 1/02* (2006.01)

(52) U.S. Cl.
CPC .. *G02F 1/133305* (2013.01); *G02F 1/133331* (2021.01); *G06F 1/1652* (2013.01);
(Continued)

(58) Field of Classification Search
None
See application file for complete search history.

(56) References Cited

U.S. PATENT DOCUMENTS

| 10,008,695 B2 | 6/2018 | Park et al. |
| 2015/0177790 A1 | 6/2015 | Uto et al. |

(Continued)

FOREIGN PATENT DOCUMENTS

| CN | 104779266 A | 7/2015 |
| CN | 105045436 A | 11/2015 |

(Continued)

*Primary Examiner* — Richard H Kim
(74) *Attorney, Agent, or Firm* — Leydig, Voit & Mayer, Ltd.

(57) ABSTRACT

This application relates to a flexible display cover plate, a display panel, and a display apparatus. The flexible display cover plate includes a first cover-plate layer and at least one auxiliary protective layer that is disposed on a face of the first cover-plate layer. The auxiliary protective layer includes a bonding layer and a second cover-plate layer that are superimposed along a direction away from the first cover-plate layer. The bonding layer is a deformable film layer, and a face that is of an outermost second cover-plate layer in the at least one auxiliary protective layer and that is away from the bonding layer is used to attach to a display substrate. When the flexible display cover plate receives external force, both the first cover-plate layer and the auxiliary protective layer can absorb and diffuse impact of the external force, thereby improving a protection effect for the display substrate.

14 Claims, 6 Drawing Sheets

(52) U.S. Cl.
CPC ..... *H04M 1/0268* (2013.01); *G02F 2201/503* (2013.01); *G02F 2202/28* (2013.01); *G06F 1/1681* (2013.01)

(56) References Cited

U.S. PATENT DOCUMENTS

| | | | |
|---|---|---|---|
| 2016/0291391 A1* | 10/2016 | Yoshida | G02F 1/133308 |
| 2018/0033832 A1 | 2/2018 | Park et al. | |
| 2018/0088392 A1 | 3/2018 | Park et al. | |
| 2018/0095502 A1* | 4/2018 | Yamazaki | G06F 1/1681 |
| 2020/0117034 A1* | 4/2020 | Yin | G06F 1/1686 |
| 2020/0260604 A1* | 8/2020 | Zhang | H05K 5/03 |

FOREIGN PATENT DOCUMENTS

| | | | |
|---|---|---|---|
| CN | 107464502 A | 12/2017 | |
| CN | 107545848 A | 1/2018 | |
| CN | 107610595 A | 1/2018 | |
| CN | 107749245 A | 3/2018 | |
| CN | 207818084 U | 9/2018 | |
| CN | 108806510 A | 11/2018 | |
| CN | 108962028 A | 12/2018 | |
| CN | 208271483 U | 12/2018 | |
| CN | 109147573 A | 1/2019 | |
| CN | 109285454 A | 1/2019 | |
| CN | 208428776 U | 1/2019 | |
| CN | 208444535 U | 1/2019 | |
| JP | 2016122097 A | 7/2016 | |
| KR | 20180034735 A | 4/2018 | |

\* cited by examiner

FLEXIBLE DISPLAY COVER PLATE, DISPLAY PANEL, AND DISPLAY APPARATUS

CROSS-REFERENCE TO RELATED APPLICATIONS

This application is a continuation of International Application No. PCT/CN2019/116399, filed on Nov. 7, 2019, which claims priority to Chinese Patent Application No. 201910126218.4, filed on Feb. 20, 2019. The disclosures of the aforementioned applications are hereby incorporated by reference in their entireties.

TECHNICAL FIELD

This application relates to a field of display technologies, and in particular, to a flexible display cover plate, a display panel, and a display apparatus.

BACKGROUND

With development of display technologies, a flexible display apparatus, by virtue of its deformable and foldable properties, has become a display device with wide applications in the display field currently. The flexible display apparatus includes a display substrate (also referred to as a flexible display layer or a flexible display backplane) and a flexible display cover plate. The flexible display cover plate has relatively high strength and anti-impact performance, to protect the display substrate from external damage.

A current flexible display cover plate is usually made of a transparent thin film or an ultra-thin glass, and the transparent thin film may be a polyimide (PI) thin film. Because the flexible display cover plate needs to be deformable and foldable, a thickness of the transparent thin film or a thickness of the ultra-thin glass is usually less than 0.1 mm. However, if the thickness of the transparent thin film is less than 0.1 mm, a buffer effect is relatively small when the flexible thin film receives external force; and if the thickness of the ultra-thin glass is less than 0.1 mm, the ultra-thin glass is fragile-prone when the ultra-thin glass receives external force. Consequently, the current flexible display cover plate provides a relatively small protection effect for the display substrate.

SUMMARY

This application provides a flexible display cover plate, a display panel, and a display apparatus, to reduce damage caused by external force to a display substrate, and improve a protection effect provided for the display substrate.

According to a first aspect, a flexible display cover plate is provided, including:
  a first cover-plate layer and at least one auxiliary protective layer that is disposed on a face of the first cover-plate layer, where
  the auxiliary protective layer includes a bonding layer and a second cover-plate layer that are superimposed along a direction away from the first cover-plate layer, where the bonding layer is a deformable film layer, and a face that is of an outermost second cover-plate layer in the at least one auxiliary protective layer and that is away from the bonding layer is used to attach to a display substrate.

When the flexible display cover plate receives external force, an impact effect caused by the external force to the flexible display cover plate are successively transferred from a force-bearing point to the first cover-plate layer and all auxiliary protective layers. In the impact effect transfer process, the first cover-plate layer, the bonding layer in the auxiliary protective layer, and the second cover-plate layer all can absorb and diffuse some impact, thereby reducing or eliminating the impact received by the display substrate.

In an optional implementation, the first cover-plate layer and/or the second cover-plate layer include/includes an ultra-thin glass.

Optionally, a thickness of the ultra-thin glass is from 0.01 mm to 0.2 mm. For example, the thickness of the ultra-thin glass may be 0.01 mm, 0.1 mm, or 0.2 mm.

For example, the first cover-plate layer includes the ultra-thin glass and a protective coating layer disposed on a face that is of the ultra-thin glass and that is close to the second cover-plate layer. A material of the protective coating layer may be a polymer material or an inorganic material, and a thickness of the protective coating layer may be 0.5 μm to 10 μm. Because a relatively large quantity of microcracks may occur during processing the ultra-thin glass, when the ultra-thin glass receives external force, the microcracks first crack, and further cause the ultra-thin glass to crack. The protective coating layer may fill the microcracks, to effectively protect the ultra-thin glass from cracking of the microcracks when the external force is received, thereby improving strength of the ultra-thin glass and improving performance of resistance to the external force received by the ultra-thin glass.

For example, the second cover-plate layer includes the ultra-thin glass and a protective coating layer that is disposed on at least one face of the ultra-thin glass.

Optionally, in an optional implementation, an orthographic projection region, on the first cover-plate layer, that is of the second cover-plate layer overlaps a region enclosed by edges of the first cover-plate layer. In another optional implementation, an orthographic projection region, on the first cover-plate layer, that is of the second cover-plate layer is located inside a region enclosed by edges of the first cover-plate layer. That is, an area of the second cover-plate layer is less than an area of the first cover-plate layer, and an edge of the second cover-plate layer does not protrude from the edge of the first cover-plate layer. For example, a length of the second cover-plate layer is less than a length of the first cover-plate layer, and/or a width of the second cover-plate layer is less than a width of the first cover-plate layer. For example, the length of the second cover-plate layer is 90% to 99.99% of the length of the first cover-plate layer, and/or the width of the second cover-plate layer is 90% to 99.99% of the width of the first cover-plate layer.

Optionally, a gap space is enclosed by a face that is of the bonding layer and that faces the second cover-plate layer and a side face of the second cover-plate layer, where an orthographic projection of the gap space on the first cover-plate layer is an annular region. The annular region may be an annular region that is enclosed by the edges of the first cover-plate layer and edges of the orthographic projection, on the first cover-plate layer, that is of the second cover-plate layer.

Optionally, there may be an air medium in the gap space, or there may be a filling material. In this case, the auxiliary protective layer further includes a transparent filling material filled in a gap enclosed by the side face of the second cover-plate layer and the face that is of the bonding layer and that faces the second cover-plate layer.

Optionally, the transparent filling material is a flexible thin-film material or an optical clear adhesive material. For example, the transparent filling material may be PI, polyethylene terephthalate (PET), polyethylene naphthalate (PEN), polycarbonate (PC), thermoplastic polyurethanes (TPU), polymethyl methacrylate (PMMA), optical clear adhesive (OCA), or ultraviolet (UV) curing adhesive.

In another optional implementation, the first cover-plate layer and/or the second cover-plate layer include/includes a flexible thin film.

Optionally, a thickness of the flexible thin film is from 0.01 mm to 0.2 mm, and/or a light transmittance of the flexible thin film is greater than or equal to 85%. For example, the thickness of the flexible thin film may be 0.01 mm, 0.1 mm, or 0.2 mm, and the light transmittance of the flexible thin film may be 85%, 90%, or 95%.

For example, the first cover-plate layer includes the flexible thin film and a hardened coating layer disposed on a face that is of the flexible thin film and that is away from the second cover-plate layer. A material of the hardened coating layer may be an organic material and/or an inorganic material. The hardened coating layer can improve scratch resistance performance of a surface of the first cover-plate layer, and reduce a probability that the surface of the first cover-plate layer is scratched, thereby improving a protection effect provided by the flexible display cover plate for the display substrate.

Optionally, a thickness of the hardened coating layer is from 0.1 μm to 100 μm, and/or a pencil hardness of the hardened coating layer is greater than or equal to 2H.

Optionally, the bonding layer meets at least one of the following conditions:
 a thickness of the bonding layer is from 0.005 mm to 0.2 mm;
 a modulus of the bonding layer is less than or equal to 0.2 MPa; and
 a material of the bonding layer is the optical clear adhesive material.

For example, the thickness of the bonding layer may be 0.005 mm, 0.05 mm, 0.1 mm, or 0.2 mm.

For example, the modulus of the bonding layer 1121 may be 0.2 MPa, 0.05 MPa, or 0.02 MPa.

For example, the material of the bonding layer is optical clear adhesive OCA or ultraviolet UV adhesive.

Optionally, the at least one auxiliary protective layer includes a plurality of superimposed auxiliary protective layers. The plurality of superimposed auxiliary protective layers can increase a thickness of the flexible display cover plate, and further increase rigidity of the flexible display cover plate. When the external force is received, the plurality of auxiliary protective layers all can absorb and diffuse the impact of the external force, so that the external force received by the display substrate is reduced, thereby improving the impact effect provided for the display substrate.

According to a second aspect, a display panel is provided, including:
 a flexible display cover plate and a display substrate, where the flexible display cover plate is the flexible display cover plate according to the first aspect, and the flexible display cover plate is disposed on the display substrate, and a face that is of a second cover-plate layer and that is away from a first cover-plate layer is attached to the display substrate.

Optionally, the display panel may be a flexible display panel.

According to a third aspect, a display apparatus is provided, including:

a display panel and a foldable housing, where the display panel is the display panel according to second aspect, and
 the foldable housing has a cavity, where the cavity is a semi-closed cavity with an opening on one face, and the display panel is accommodated into the cavity by using the opening, and is fixedly connected to an inner wall of the cavity.

For example, the foldable housing includes a first sub-housing, a second sub-housing, and a hinge, where the first sub-housing and the second sub-housing are moveably connected by using the hinge to enclose the cavity, and some of edges of the flexible display cover plate are fixedly connected to the first sub-housing, and the other of the edges are fixedly connected to the second sub-housing.

Optionally, both the flexible display cover plate and the display substrate are in a rectangular shape, the edges of the flexible display cover plate are respectively parallel to edges of the display substrate, at least two opposite edges of the flexible display cover plate protrude from the edges of the display substrate, and some of the at least two opposite edges on a face that is of the flexible display cover plate and that faces the display substrate are glued to the first sub-housing, and the other of the at least two opposite edges are glued to the second sub-housing.

The technical solutions provided in this application may bring at least the following beneficial effects.

According to the flexible display cover plate, the display panel, and the display apparatus provided in this application, when the flexible display cover plate receives the external force, both the first cover-plate layer and the auxiliary protective layer can absorb and diffuse the impact of the external force, so that the external force received by the display substrate is reduced, and damage caused by the external force to the display substrate is reduced, thereby improving the protection effect provided for the display substrate. In addition, when the flexible display cover plate is folded, the bonding layer expands to the edges of the flexible display cover plate due to deformation, so that changes of the first cover-plate layer and the second cover-plate layer are reduced in a tensile modulus and a thickness during folding, and the rigidity of the flexible display cover plate at a same bending radius is increased, thereby improving the protection effect provided for the display substrate.

DESCRIPTION OF EMBODIMENTS

A current flexible display cover plate is usually made of a transparent thin film or an ultra-thin glass.

Figure 1:
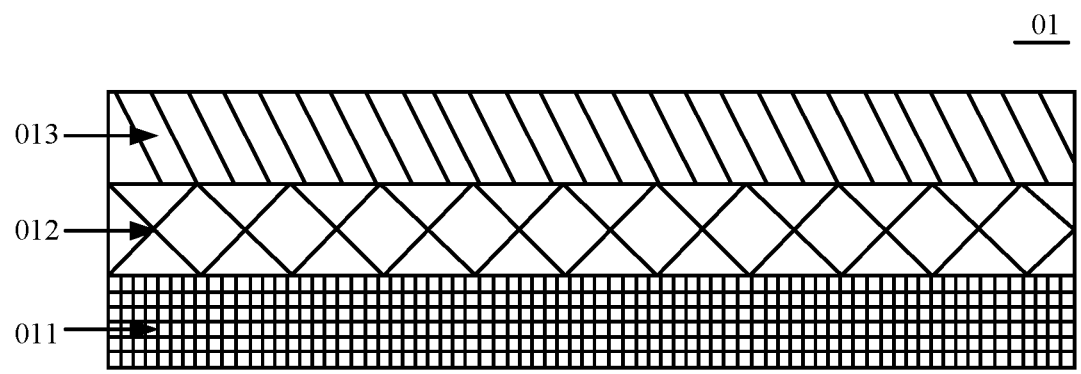
FIG. 1 is a schematic structural diagram of a conventional flexible display cover plate.

When the flexible display cover plate is made of the transparent thin film, refer to FIG. 1. FIG. 1 is a schematic structural diagram of a conventional flexible display cover plate 01. The flexible display cover plate 01 includes a transparent bonding layer 011, a PI thin film 012 disposed on a face of the transparent bonding layer 011, and a hardening film 013 disposed on a face that is of the PI thin film 012 and that is away from the transparent bonding layer 011, where a face that is of the transparent bonding layer 011 and that is away from the PI thin film 012 is used to attach to a display substrate. To enable the flexible display cover plate 01 to be deformable and foldable, a thickness of the PI thin film 012 is usually less than 0.1 mm. If the thickness of the PI thin film 012 is less than 0.1 mm, a buffer effect is relatively small when the flexible display cover plate 01 receives external force. Consequently, the flexible display cover plate 01 provides a relatively small protection effect for the display substrate. In addition, as the flexible display cover plate 01 has relatively poor rigidness, a surface is uneven after the flexible display cover plate 01 is attached to the display substrate, resulting in relatively poor surface delicacy of the flexible display cover plate.

Figure 2:
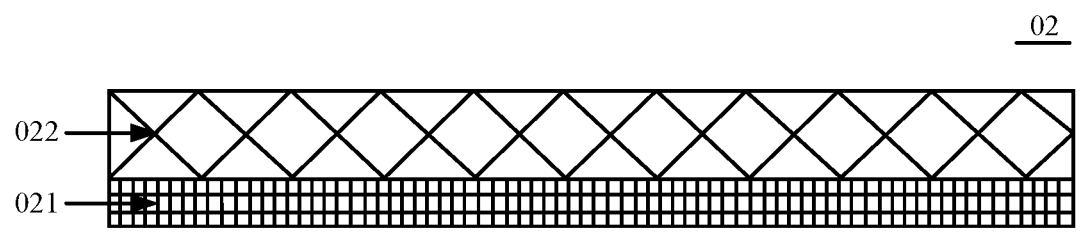
FIG. 2 is a schematic structural diagram of another conventional flexible display cover plate.

When the flexible display cover plate is made of the ultra-thin glass, refer to FIG. 2. FIG. 2 is a schematic structural diagram of another conventional flexible display cover plate 02. The flexible display cover plate 02 includes a transparent bonding layer 021 and an ultra-thin glass 022 that is disposed on a face of the transparent bonding layer 021, where the face that is of the transparent bonding layer 021 and that is away from the ultra-thin glass 022 is used to attach to a display substrate. To enable the flexible display cover plate to be deformable and foldable, a thickness of the ultra-thin glass 022 is usually less than 0.1 mm. If the thickness of the ultra-thin glass 022 is less than 0.1 mm, the flexible display cover 02 has relatively poor rigidness, and the flexible display cover plate 02 is fragile-prone when the flexible display cover plate 02 receives external force. Consequently, the flexible display cover plate 02 provides a relatively small protection effect for the display substrate.

Figure 3:
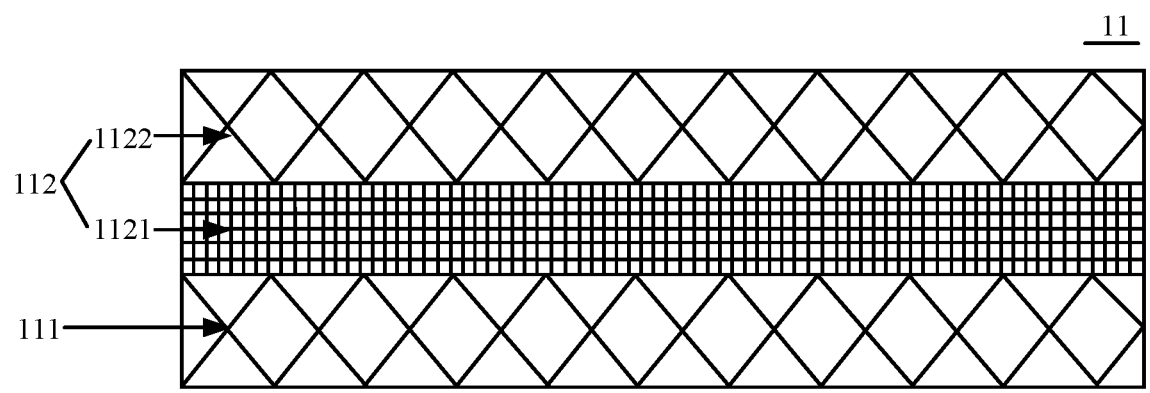
FIG. 3 is a schematic structural diagram of a flexible display cover plate according to an embodiment of this application.

An embodiment of this application provides a flexible display cover plate. FIG. 3 is a schematic structural diagram of a flexible display cover plate 11 according to an embodiment of this application. The flexible display cover plate 11 includes a first cover-plate layer 111 and at least one auxiliary protective layer 112 that is disposed on a face of the first cover-plate layer 111. FIG. 3 uses an example in which the flexible display cover plate 11 includes one auxiliary protective layer 112 for description.

The auxiliary protective layer 112 includes a bonding layer 1121 and a second cover-plate layer 1122 that are superimposed along a direction away from the first cover-plate layer 111, where the bonding layer 1121 is a deformable film layer, and a face that is of the outermost second cover-plate layer 1122 in the at least one auxiliary protective layer 112 and that is away from the bonding layer 1121 is used to attach to a display substrate.

When the flexible display cover plate receives external force, an impact effect caused by the external force to the flexible display cover plate are successively transferred from a force-bearing point to the first cover-plate layer 111 and all auxiliary protective layers. In the impact effect transfer process, the first cover-plate layer 111, both the bonding layer 1121 and the second cover-plate layer 1122 in the auxiliary protective layer 112 can absorb and diffuse some impact effect, so that the impact effect received by the display substrate is reduced or eliminated.

Figure 4:
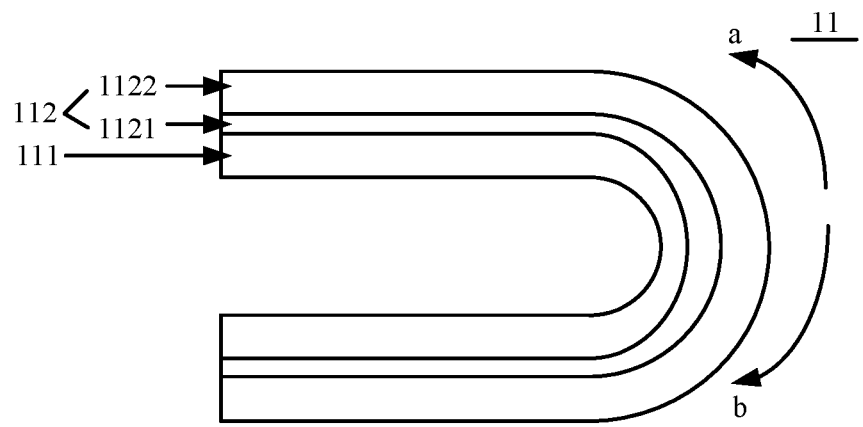
FIG. 4 is a schematic diagram of the flexible display cover plate shown in FIG. 3 in a folded state.

Further, refer to FIG. 4. FIG. 4 is a schematic diagram of the flexible display cover plate 11 shown in FIG. 3 in a folded state. When the flexible display cover plate 11 is folded, the bonding layer 1121 expands to edges of the flexible display cover plate 11 due to deformation of the bonding layer 1121. That is, the bonding layer 1121 expands in a direction a and a direction b, so that changes of the first cover-plate layer 111 and the second cover-plate layer 1122 are reduced in a tensile modulus and a thickness during folding. This can reduce a probability that problems such as cracks, whitening, and deformation occur on the first cover-plate layer 111 and the second cover-plate layer 1122 during folding. In addition, a degree of the thickness change of the flexible display cover plate 11 during folding can be reduced. Compared with a related technology, a thickness of the flexible display cover plate 11 at a same bending radius is increased, thereby increasing rigidness of the flexible display cover plate 11 at the same bending radius.

For example, a material of the bonding layer 1121 may meet at least one of the following conditions: 1. A modulus (also referred to as an elastic modulus) of the bonding layer 1121 is less than or equal to 0.2 MPa. 2. The material of the bonding layer 1121 is an optical clear adhesive material. 3. A thickness of the bonding layer 1121 may be from 0.005 mm to 0.2 mm. For example, the material of the bonding layer 1121 may be a low-modulus optical clear adhesive material, to implement deformability of the bonding layer 1121. Further, the material of the bonding layer 1121 may be an OCA or a UV curing adhesive whose moduli are less than or equal to 0.2 MPa. For example, the modulus of the bonding layer 1121 may be 0.2 MPa, 0.05 MPa, or 0.02 MPa. For another example, the thickness of the bonding layer 1121 may be 0.005 mm, 0.05 mm, 0.1 mm, or 0.2 mm.

In conclusion, in the flexible display cover plate provided in this embodiment of this application, when the flexible display cover plate receives external force, both the first cover-plate layer and the auxiliary protective layer can absorb and diffuse impact of the external force, so that the external force received by the display substrate is reduced. This reduces damage caused by the external force to the display substrate, and improves the protection effect provided for the display substrate. In addition, when the flexible display cover plate is folded, the bonding layer expands to edges of the flexible display cover plate due to deformation, so that changes of the first cover-plate layer and the second cover-plate layer are reduced in a tensile modulus and a thickness during folding, and the rigidness of the flexible display cover plate at a same bending radius is increased, thereby improving the protection effect provided for the display substrate.

For example, in an optional implementation, the first cover-plate layer 111 and/or the second cover-plate layer 1122 include/includes a flexible thin film. A material of the flexible thin film may be PI, PET, PEN, PC, TPU, PMMA, polyaramide, and/or silicon gel. For example, a thickness of the flexible thin film may be from 0.01 mm to 0.2 mm. For example, the thickness of the flexible thin film may be 0.01 mm, 0.1 mm, or 0.2 mm. A light transmittance of the flexible thin film may be greater than or equal to 85%. For example, the light transmittance of the flexible thin film may be 85%, 90%, or 95%.

In another optional implementation, the first cover-plate layer 111 and/or the second cover-plate layer 1122 include/includes an ultra-thin glass. The ultra-thin glass may be soda-lime glass, aluminosilicate glass, soda aluminosilicate glass, lithium aluminosilicate glass, or phosphorus aluminosilicate glass. For example, a thickness of the ultra-thin glass may be from 0.01 mm to 0.2 mm. For example, the thickness of the ultra-thin glass may be 0.01 mm, 0.1 mm, or 0.2 mm.

For the foregoing two optional implementations, the first cover-plate layer may be the flexible thin film or the ultra-thin glass, and the second cover-plate layer may be the flexible thin film or the ultra-thin glass. Correspondingly, there may be a plurality of combinations of the first cover-plate layer and the second cover-plate layer. In the embodiments of this application, the flexible display cover plate is further described by using the following several feasible implementations as examples.

Figure 5:
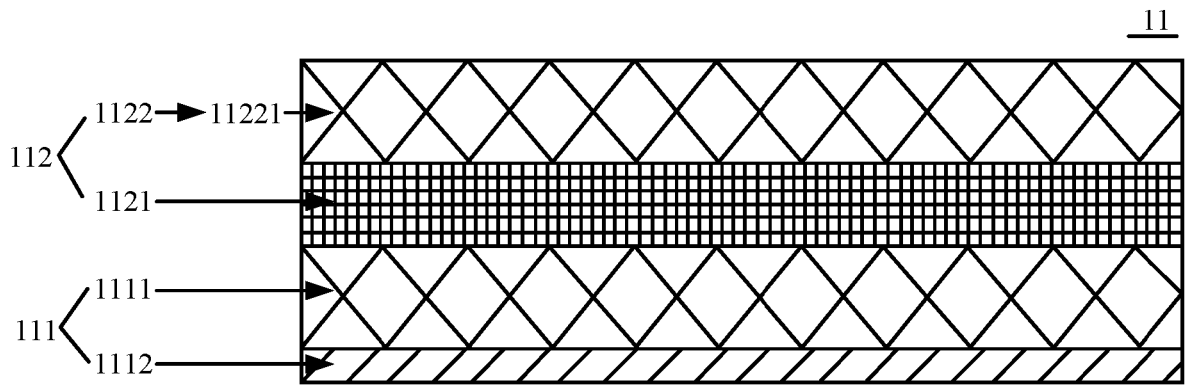
FIG. 5 is a schematic structural diagram of another flexible display cover plate according to an embodiment of this application.

In a first feasible implementation, both the first cover-plate layer 111 and the second cover-plate layer 1122 include the flexible thin film. FIG. 5 is a schematic structural diagram of another flexible display cover plate 11 according to an embodiment of this application. A first cover-plate layer 111 includes a flexible thin film 1111 and a hardened coating layer 1112 disposed on a face that is of the flexible thin film 1111 and that is away from a second cover-plate layer 1122. A thickness of the flexible thin film 1111 is from 0.07 mm to 0.09 mm, and a light transmittance of the flexible thin film 1111 is greater than or equal to 88%. A material of the hardened coating layer 1112 may be an organic material and/or an inorganic material. For example, the organic material may be acrylic resin, epoxy resin, silicone resin, and/or siloxane; and the inorganic material may be silicon dioxide, aluminum oxide, zirconium oxide, graphene, and/or diamond. For example, a thickness of the hardened coating layer 1112 may be from 0.1 μm to 100 μm. For example, the thickness of the hardened coating layer 1112 may be 0.1 μm, 10 μm, or 100 μm. A pencil hardness of the hardened coating layer 1112 may be greater than or equal to 2H, so that scratch resistance performance of a surface of the first cover-plate layer 111 can be improved, and a probability that the surface of the first cover-plate layer 111 is scratched is reduced, thereby improving a protection effect provided by the flexible display cover plate 11 for a display substrate. The second cover-plate layer 1122 includes a flexible thin film 11221, a thickness of the flexible thin film 11221 is from 0.07 mm to 0.09 mm, and a light transmittance of the flexible thin film 11221 is greater than or equal to 88%. The pencil hardness is a hardness of a film layer that is obtained by testing the hardness of the film layer by using a drawing lead or pencil lead with a given hardness. For example, the pencil hardness may be obtained through testing by exerting a load of 1 kgf according to an ASTM D3363 standard.

In the first feasible implementation, the hardened coating layer 1112 is disposed on the face that is of the flexible thin film 1111 and that is away from the second cover-plate layer 1122, so that the scratch resistance performance of the surface of the first cover-plate layer 111 can be improved, and the protection effect provided by the flexible display cover plate 11 for the display substrate is improved. The flexible display cover plate 11 in the first feasible implementation can be folded inward or outward for 100,000 times. A pencil hardness of the flexible display cover plate 11 can be up to 3H or above. In addition, when the flexible display cover plate 11 is applied to a display apparatus, the display apparatus is not damaged when a pencil falling test is conducted at a height of 15 centimeter (cm). A process of the pencil falling test is as follows: freely dropping a pencil toward a face of the display cover plate of the display apparatus, and after the pencil freely falls on the display cover plate, testing whether the display apparatus is damaged. For example, the pencil may have a weight of 12 gram (g), and have a nib with a diameter of 0.5 mm.

Figure 6:
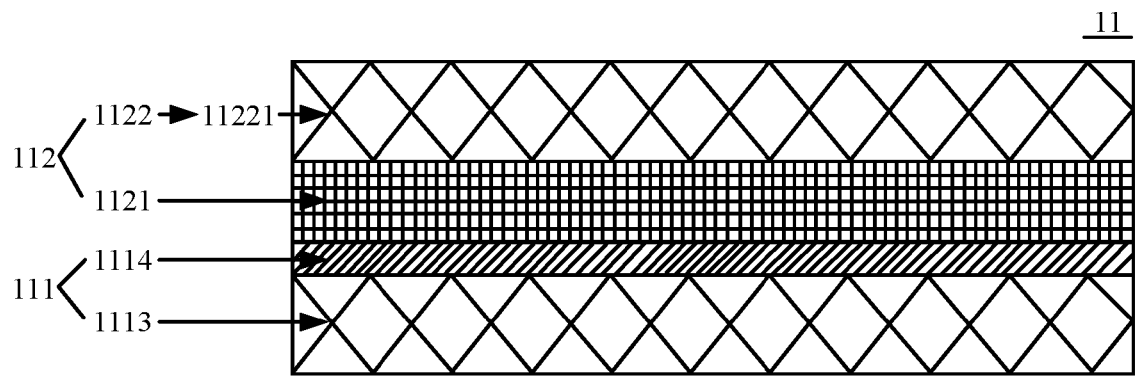
FIG. 6 is a schematic structural diagram of still another flexible display cover plate according to an embodiment of this application.

In a second feasible implementation, the first cover-plate layer 111 includes the ultra-thin glass, and the second cover-plate layer 1122 includes the flexible thin film. FIG. 6 is a schematic structural diagram of yet another flexible display cover plate 11 according to an embodiment of this application. The first cover-plate layer 111 includes an ultra-thin glass 1113 and a protective coating layer 1114 disposed on a face that is of the ultra-thin glass 1113 and that is close to the second cover-plate layer 1122. A thickness of the ultra-thin glass 1113 may be from 0.07 mm to 0.09 mm, and a light transmittance of the ultra-thin glass 1113 is greater than or equal to 88%. A material of the protective coating layer 1114 may be a polymer material or an inorganic material. A thickness of the protective coating layer 1114 may be from 0.5 μm to 10 μm. The second cover-plate layer 1122 includes a flexible thin film 11221. For a specific structure of the second cover-plate layer 1122, refer to the second cover-plate layer 1122 shown in FIG. 5. Details are not described herein again in this embodiment of this application.

Figure 7:
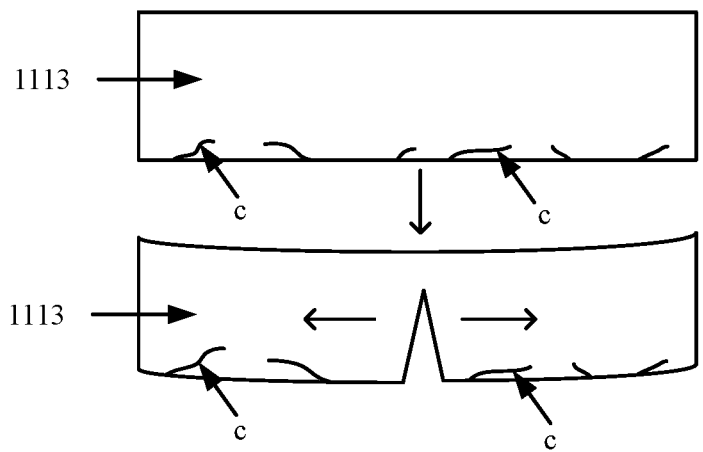
FIG. 7 is a schematic diagram of a principle for causing cracks in an ultra-thin glass according to an embodiment of this application.
Figure 8:
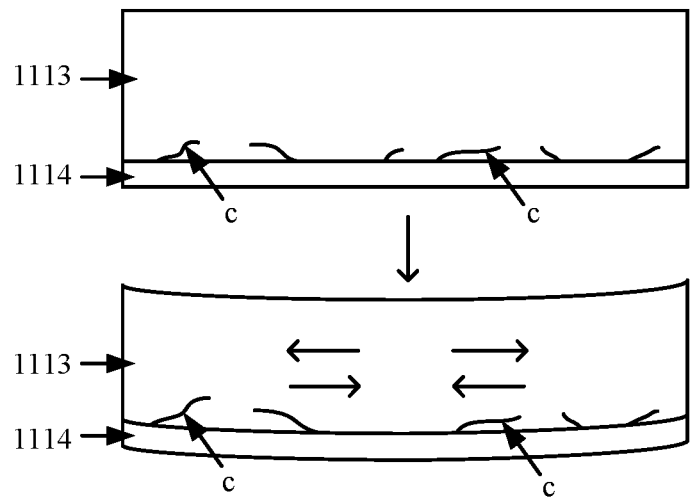
FIG. 8 is a schematic diagram of a related principle for protecting an ultra-thin glass by using a protective coating layer according to an embodiment of this application.

FIG. 7 is a schematic diagram of a principle for causing cracks in an ultra-thin glass 1113 according to an embodiment of this application. A relatively large quantity of microcracks c may occur in the ultra-thin glass 1113 in a processing process. When the ultra-thin glass 1113 receives an external force, the microcracks c first crack, and further cause the ultra-thin glass 1113 to crack. FIG. 8 is a schematic diagram of a related principle for protecting the ultra-thin glass 1113 by using a protective coating layer 1114 according to an embodiment of this application. The protective coating layer 1114 may fill the microcracks c, to effectively protect the ultra-thin glass 1113 from cracks of the microcracks c when the external force is received, thereby improving strength of the ultra-thin glass 1113 and improving performance of resistance to the external force received by the ultra-thin glass 1113.

In the second feasible implementation, the protective coating layer 1114 disposed on the face that is of the ultra-thin glass 1113 and that is close to the second cover-plate layer 1122 can improve the strength of the ultra-thin glass 1113, and improve the performance of resistance to the external force received by the ultra-thin glass 1113, thereby improving a protection effect provided by the flexible display cover plate 11 for a display substrate. In the second feasible implementation, the flexible display cover plate can be folded inward or outward for 100,000 times, a pencil hardness of the flexible display cover plate can be up to 3H or above. In addition, when the flexible display cover plate is applied to a display apparatus, the display apparatus is not damaged when a pencil falling test is conducted at a height of 20 cm.

Figure 9:
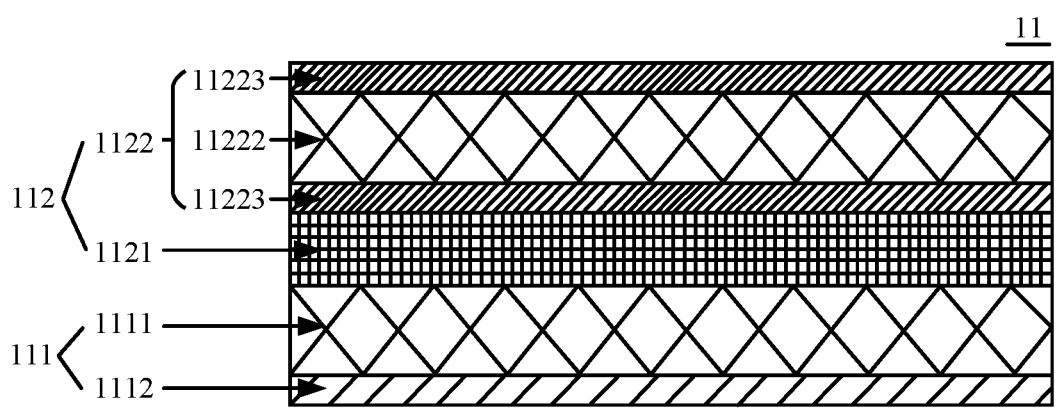
FIG. 9 is a schematic structural diagram of yet another flexible display cover plate according to an embodiment of this application.

In a third feasible implementation, the first cover-plate layer 111 includes the flexible thin film, and the second cover-plate layer 1122 includes the ultra-thin glass. FIG. 9 is a schematic structural diagram of another flexible display cover plate 11 according to an embodiment of this application. The first cover-plate layer 111 includes a flexible thin film 1111 and a hardened coating layer 1112 disposed on a face that is of the flexible thin film 1111 and that is away from the second cover-plate layer 1122. For the first cover-plate layer 111, refer to the first cover-plate layer 111 shown in FIG. 5. Details are not described herein again in this embodiment of this application. The second cover-plate layer 1122 includes an ultra-thin glass 11222 and a protective coating layer 11223 that is disposed on at least one face of the ultra-thin glass 11222. FIG. 9 uses an example in which the protective coating layers 11223 are disposed on two faces of the ultra-thin glass 11222 for description. A thickness of the ultra-thin glass 11222 may be from 0.05 mm to 0.09 mm, and a light transmittance of the ultra-thin glass 11222 is greater than or equal to 88%.

In the third feasible implementation, the hardened coating layer 1112 is disposed on the face that is of the flexible thin film 1111 and that is away from the second cover-plate layer 1122, so that scratch resistance performance of a surface of the first cover-plate layer 111 can be improved, and a protection effect provided by the flexible display cover plate 11 for a display substrate is improved. The protective coating layer 11223 that is disposed on at least one face of the ultra-thin glass 11222 can improve strength of the ultra-thin glass 11222, and improve performance of resistance to the external force received by the ultra-thin glass 11222, thereby improving the protection effect provided by the flexible display cover plate 11 for the display substrate. The protective coating layers 11223 that are disposed on the two faces of the ultra-thin glass 11222 can further improve the strength of the ultra-thin glass 11222, and improve the performance of resistance to the external force received by the ultra-thin glass 11222, thereby improving the protection effect provided by the flexible display cover plate 11 for the display substrate.

Optionally, in a first optional implementation, an orthographic projection region, the first cover-plate layer 111, that is of the second cover-plate layer 1122 overlaps a region enclosed by edges of the first cover-plate layer 111. In a second optional implementation, an orthographic projection region, on the first cover-plate layer 111, that is of the second cover-plate layer 1122 may be located inside a region enclosed by edges of the first cover-plate layer 111. That is, an area of the second cover-plate layer 1122 is less than an area of the first cover-plate layer 111, and an edge of the second cover-plate layer 1122 does not protrude from the edge of the first cover-plate layer 111. For example, a length of the second cover-plate layer 1122 is less than a length of the first cover-plate layer 111, and/or a width of the second cover-plate layer 1122 is less than a width of the first cover-plate layer 111. For example, the length of the second cover-plate layer 1122 may be 90% to 99.99% of the length of the first cover-plate layer 111, and/or the width of the second cover-plate layer 1122 may be 90% to 99.99% of the width of the first cover-plate layer 111.

Figure 10:
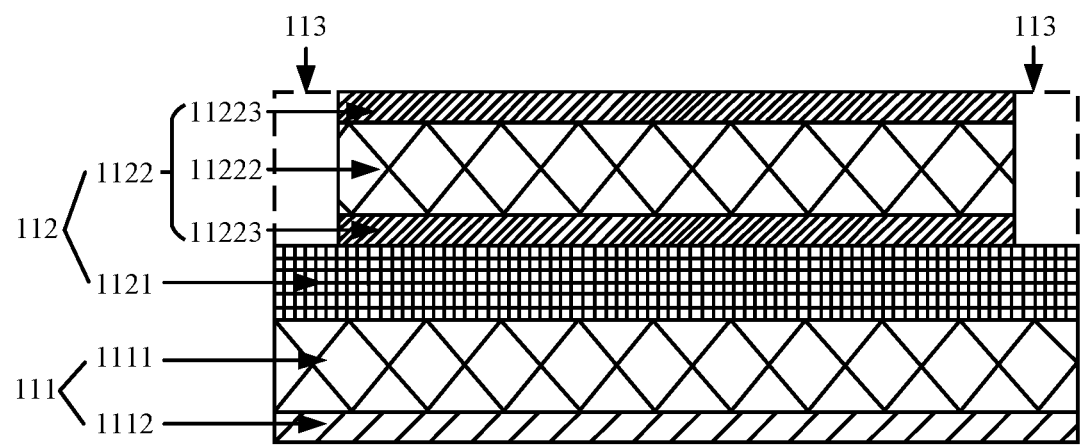
FIG. 10 is a schematic structural diagram of yet another flexible display cover plate according to an embodiment of this application.

For example, FIG. 10 is a schematic structural diagram of still another flexible display cover plate 11 according to an embodiment of this application. A gap space 113 is enclosed by a face that is of a bonding layer 1121 and that faces a second cover-plate layer 1122 and a side face of the second cover-plate layer 1122. An orthographic projection that is of the gap space 113 and that is located in a first cover-plate layer 111 is located inside a region enclosed by edges of the first cover-plate layer 111.

Figure 11:
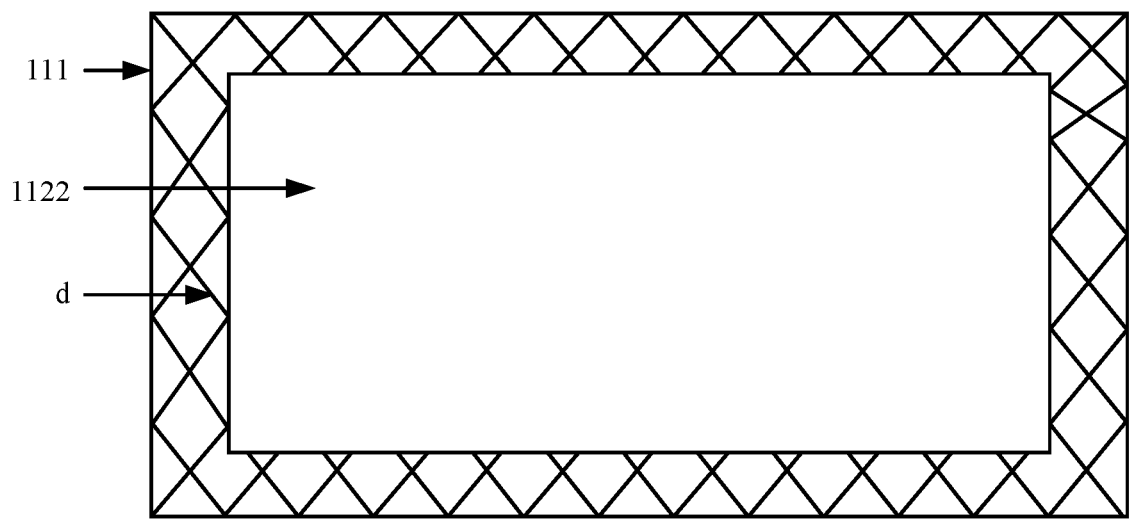
FIG. 11 is a schematic top view of a flexible display cover plate according to an embodiment of this application.

For example, FIG. 11 is a schematic top view of a flexible display cover plate 11 according to an embodiment of this application. An orthographic projection, on a first cover-plate layer 111, that is of a gap space 113 is an annular region. The annular region may be an annular region that is enclosed by edges of the first cover-plate layer 111 and edges of an orthographic projection, on the first cover-plate layer 111, that is of a second cover-plate layer 1122. When the second cover-plate layer 1122 includes an ultra-thin glass 11222, because the ultra-thin glass 11222 has a higher hardness than a flexible thin film, the ultra-thin glass 11222 is prone to crack when the ultra-thin glass 11222 is directly in contact with an external surface. Therefore, the gap space 113 can protect the ultra-thin glass 11222 from direct contact with the external surface. This reduces a probability that cracks occur on a flexible display apparatus when the flexible display apparatus receives external collision, and improves a strength of the flexible display cover plate 11.

In an optional implementation, there is an air medium in the gap space 113. In another optional implementation, the foregoing auxiliary protective layer 112 further includes a transparent filling material filled in a gap enclosed by the side face of the second cover-plate layer 1122 and the face that is of the bonding layer 1121 and that faces the second cover-plate layer 1122. For example, the transparent filling material may be a flexible thin-film material or an optical clear adhesive material. For example, the transparent filling material may be PI, PET, PEN, PC, TPU, PMMA, polyaramide, OCA, or UV curing adhesive.

Optionally, in the flexible display cover plate 11 provided in the embodiments of this application, the at least one auxiliary protective layer 112 may include a plurality of superimposed auxiliary protective layers 112. The plurality of superimposed auxiliary protective layers 112 can increase a thickness of the flexible display cover plate 11, and further increase rigidity of the flexible display cover plate 11. When the display substrate receives external force, the plurality of auxiliary protective layers all can absorb and diffuse impact of the external force, so that the external force received by the display substrate is reduced, thereby improving a protection effect provided for the display substrate.

Figure 12:
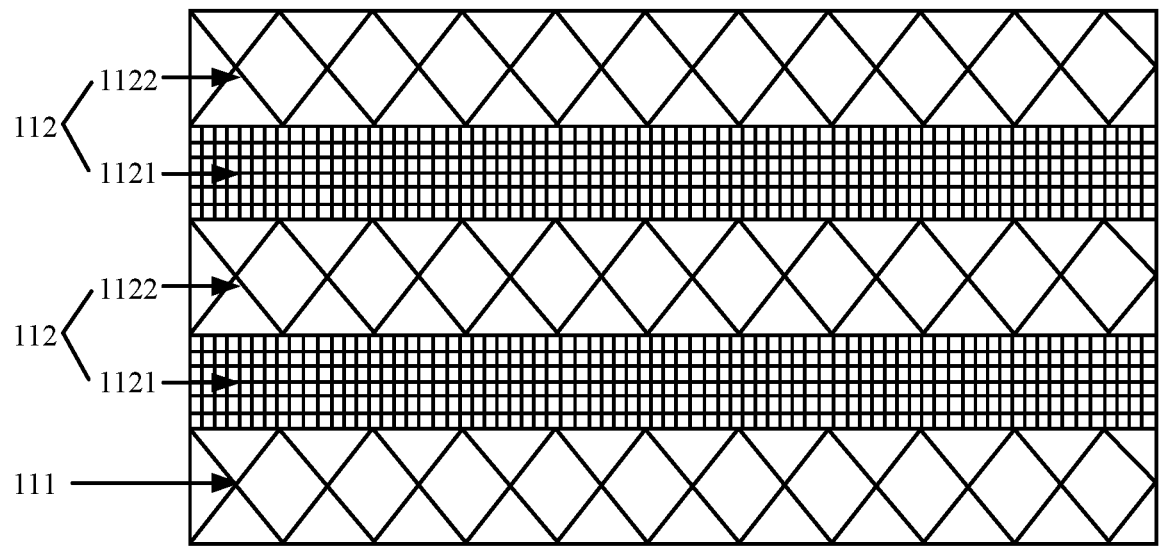
FIG. 12 is a schematic structural diagram of yet another flexible display cover plate according to an embodiment of this application.

For example, FIG. 12 is a schematic structural diagram of still another flexible display cover plate 11 according to an embodiment of this application. In FIG. 12, at least one auxiliary protective layer 112 includes two superimposed auxiliary protective layers 112. For both a first cover-plate layer 111 and the auxiliary protective layer 112 in the flexible display cover plate 11, refer to any flexible display cover plate 11 provided in the embodiments of this application. Details are not described herein again in this embodiment of this application. It should be noted that the flexible display cover plate shown in FIG. 12 can be folded inward or outward for 100,000 times. A pencil hardness of the flexible display cover plate can be up to 3H or above. In addition, when the flexible display cover plate is applied to a display apparatus, the display apparatus is not damaged when a pencil falling test is conducted at a height of 25 cm.

Optionally, when the at least one auxiliary protective layer 112 includes a plurality of superimposed auxiliary protective layers 112, it is assumed that at least one second cover-plate layer 1122 in the plurality of auxiliary protective layers 112 includes an ultra-thin glass, and that an orthographic projection region, on first cover-plate layer 111, that is of the second cover-plate layer 1122 including the ultra-thin glass is located inside a region enclosed by edges of the first cover-plate layer 111 (that is, an area of the second cover-plate layer 1122 is less than an area of the first cover-plate layer 111, and an edge of the second cover-plate layer 1122 does not protrude from the edge of the first cover-plate layer 111). In an optional example, an orthographic projection region, on the ultra-thin glass, that is of a bonding layer 1121 in the auxiliary protective layer 112 in which the ultra-thin glass is located may overlap a region enclosed by edges of the ultra-thin glass (that is, a shape and a size of the bonding layer 1121 are the same as those of the ultra-thin glass). In another optional example, an orthographic projection region, on the ultra-thin glass, that is of a bonding layer 1121 in the auxiliary protective layer 112 in which the ultra-thin glass is located may be located outside a region enclosed by edges of the ultra-thin glass (that is, an area of the bonding layer 1121 is greater than an area of the ultra-thin glass, and an edge of the bonding layer 1121 protrudes from the edge of the ultra-thin glass).

Further, when the second cover-plate layer 1122 in the auxiliary protective layer 112 that is adjacent to the auxiliary protective layer 112 in which the ultra-thin glass is located includes a flexible thin film, in a first optional example, the orthographic projection region of the bonding layer 1121, on the ultra-thin glass, that is in the auxiliary protective layer 112 in which the flexible thin film is located may overlap the region enclosed by the edges of the ultra-thin glass (that is, the bonding layer 1121 has the same shape and size as those of the ultra-thin glass). In this case, for the flexible thin film in this case, an orthographic projection region, on the ultra-thin glass, of the flexible thin film may overlap the region enclosed by the edges of the ultra-thin glass (that is, a shape and a size of the flexible thin film are the same as those of the ultra-thin glass). The orthographic projection region, on the ultra-thin glass, of the flexible thin film may also be located outside the region enclosed by the edges of the ultra-thin glass (that is, an area of the flexible thin film is greater than the area of the ultra-thin glass, and an edge of the flexible thin film protrudes from the edge of the ultra-thin glass). In another optional example, an orthographic projection region, on the ultra-thin glass, that is of the bonding layer 1121 in the auxiliary protective layer 112 in which the flexible thin film is located may be located outside the region enclosed by the edges of the ultra-thin glass (that is, the area of the bonding layer 1121 is greater than the area of the ultra-thin glass, and the edge of the bonding layer 1121 protrudes from the edge of the ultra-thin glass).

According to the flexible display cover plate 11 provided in this embodiment of this application, when external force is received, the first cover-plate layer 111, the bonding layer 1121, and the second cover-plate layer 1122 all can absorb and diffuse impact of the external force, so that damage caused by the external force to the display substrate is reduced, thereby improving a protection effect provided for the display substrate. In addition, a multi-layer structure of the flexible display cover plate 11 can increase rigidity of the flexible display cover plate 11, to make a surface smooth after the flexible display cover plate 11 is attached to the display substrate, thereby improving surface delicacy of the flexible display cover plate 11.

It should be noted that the flexible display cover plate 11 provided in this embodiment of this application usually does not have a display function. However, because the flexible display cover plate 11 is attached to the display substrate, a finally formed display panel has the display function. Therefore, a flexible display cover plate is called.

In conclusion, in the flexible display cover plate provided in the embodiments of this application, when external force is received, both the first cover-plate layer and the auxiliary protective layer can absorb and diffuse the impact of the external force, so that the external force received by the display substrate is reduced, and damage caused by the external force to the display substrate is reduced, thereby improving the protection effect provided for the display substrate. In addition, when the flexible display cover plate is folded, the bonding layer expands to edges of the flexible display cover plate due to deformation, so that changes of the first cover-plate layer and the second cover-plate layer are reduced in a tensile modulus and a thickness during folding, and rigidness of the flexible display cover plate at a same bending radius is increased, thereby improving the protection effect provided for the display substrate. Further, the multi-layer structure of the flexible display cover plate can increase the rigidness of the flexible display cover plate, to make the surface smooth after the flexible display cover plate is attached to the display substrate, thereby improving the surface delicacy of the flexible display cover plate.

Figure 13:
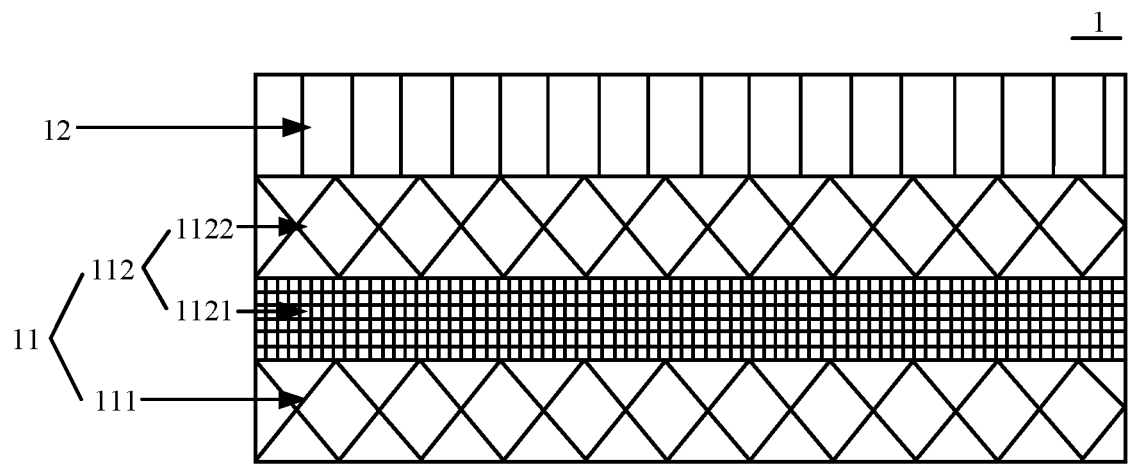
FIG. 13 is a schematic structural diagram of a display panel according to an embodiment of this application.

An embodiment of this application provides a display panel 1. For example, referring to FIG. 13, the display panel 1 includes a flexible display cover plate 11 and a display substrate 12. The flexible display cover plate 11 is any flexible display cover plate provided in the embodiments of this application. The flexible display cover plate 11 is disposed on the display substrate 12, and a face that is of the second cover-plate layer 1122 and that is away from the first cover-plate layer 111 is attached to the display substrate 12. For example, the display substrate 12 may be a flexible display substrate.

Optionally, the face that is of the second cover-plate layer 1122 and that is away from the first cover-plate layer 111 may be glued to the display substrate 12. An adhesive process may be as follows: placing the flexible display cover plate 11 on a bearing machine, applying glass cement on the flexible display cover plate 11, aligning the display substrate 12 with the flexible display cover plate 11, and moving and heating the glass cement by using a laser beam to melt the glass cement, so that the flexible display cover plate 11 and the display substrate 12 are sealingly connected by using the melted glass cement.

For example, the display panel 1 may be a flexible display panel. Further, the display panel may be a flexible organic light-emitting diode (OLED) display panel, a flexible quantum dot light emitting diode (QLED), or the like. This is not limited in this embodiment of this application.

Figure 14:
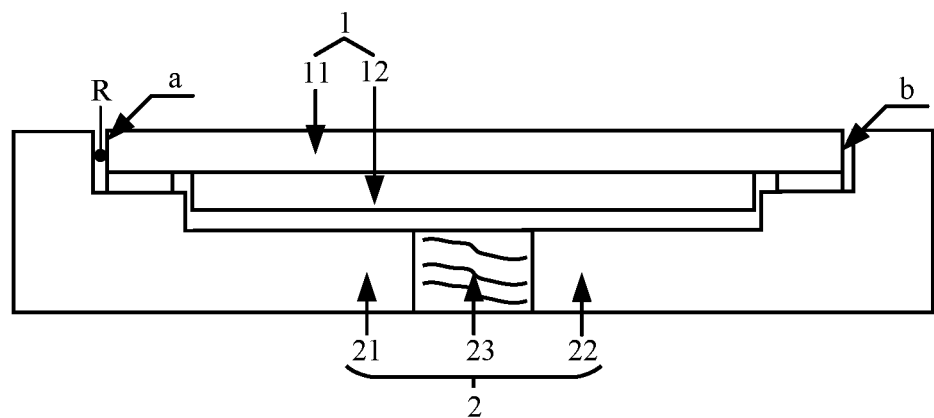
FIG. 14 is a schematic structural diagram of a display apparatus according to an embodiment of this application.

An embodiment of this application provides a display apparatus. Referring to FIG. 14, the display apparatus includes a display panel 1 and a foldable housing 2. The display panel 1 is any display panel according to the embodiments of this application.

For example, the foldable housing 2 has a cavity with an opening on one face. As shown in FIG. 14, the cavity is a semi-closed cavity, and the cavity has the opening on one face. The display panel 1 is accommodated into the cavity by using the opening, and is fixedly connected to an inner wall of the cavity. In an example, the foldable housing 2 is made of a deformable material by using an injection molding technology. That is, the foldable housing 2 is an all-in-one structure.

In another example, the foldable housing 2 includes a first sub-housing 21, a second sub-housing 22, and a hinge 23. The first sub-housing 21 and the second sub-housing 22 are moveably connected by using the hinge 23 to enclose the cavity. For example, the cavity may be a rectangular cavity, or may be an irregular cavity. Edges of the flexible display cover plate 11 are fixedly connected to both the first sub-housing 21 and the second sub-housing 22. That is, some edges of the flexible display cover plate 11 are fixedly connected to the first sub-housing 21, and the other edges are fixedly connected to the second sub-housing. For example, the edges of the flexible display cover plate 11 may be fixedly attached to both the first sub-housing 21 and the second sub-housing 22. For example, the edges of the flexible display cover plate 11 may be glued to both the first sub-housing 21 and the second sub-housing 22.

For example, the flexible display cover plate 11 and the display substrate 12 are both in a rectangular shape. The edges of the flexible display cover plate 11 are respectively parallel to edges of the display substrate 12, and at least two opposite edges of the flexible display cover plate 11 protrude from the edges of the display substrate 12. Some of the at least two opposite edges on a face that is of the flexible display cover plate 11 and that faces the display substrate 12 are glued to the first sub-housing 21, and the other of the at least two opposite edges are glued to the second sub-housing 22. As shown in FIG. 14, an edge a and an edge b are two opposite edges on the face that is of the flexible display cover plate 11 and that faces the display substrate 12. The edge a is glued to the first sub-housing 21, and the edge b is glued to the second sub-housing 22. Further, two edges that are perpendicular to the edge a and the edge b in FIG. 14 may also be glued to the first sub-housing 21 and the second sub-housing 22. A half of each of the two edges that are perpendicular to the edge a and the edge b is glued to the first sub-housing 21, and the other half is glued to the second sub-housing 22. Four edges of the face that is of the flexible display cover plate 11 and that faces the display substrate 12 are glued to the first sub-housing 21 and the second sub-housing 22, so that the display panel 1 is effectively and fixedly connected to the foldable housing 2, and a closed cavity formed between the display panel 1 and the foldable housing 2 can isolate a component placed in the cavity from hydroxide, thereby slowing aging of the component. It should be noted that there is usually a gap R between a side edge of the flexible display cover plate 11 and an interior of the cavity of the foldable housing 2. The gap R may provide a buffer space for the flexible display cover plate 11 when the display apparatus is folded, to protect the flexible display cover plate 11 from damage caused by extrusion between the side edge of the flexible display cover plate 11 and an inner wall of the cavity in the folding process of the display apparatus.

It should be noted that at least one of the four edges of the face that is of the flexible display cover plate 11 and that faces the display substrate 12 is glued to the first sub-housing 21, and the other at least one edge is glued to the second sub-housing 22.

For example, the foregoing display apparatus may further include a housing, a printed circuit board (PCB), a chip, and the like. The housing, the PCB, and the chip are all located in the foregoing cavity. For example, the housing, the PCB, and the chip may be disposed in the cavity between the foldable housing 2 and the face that is of the display substrate 11 and that faces the foldable housing 2.

For example, the display apparatus usually further includes a processor and a memory.

The processor may include one or more processing cores, for example, may be a 4-core processor or an 8-core processor. The processor may be implemented in at least one hardware form of digital signal processing (DSP), a field-programmable gate array (FPGA), or a programmable logic array (PLA). The processor may also include a main processor and a coprocessor. The main processor is a processor that is configured to process data in a wake-up state, and is also referred to as a central processing unit (CPU). The coprocessor is a low-power-consumption processor configured to process data in a standby state. Optionally, a graphics processing unit (GPU) may be integrated in the processor, and the GPU is configured to be responsible for rendering and drawing content that needs to be displayed on the display panel 1. Optionally, the processor may further include an artificial intelligence (AI) processor, and the AI processor is configured to process a computing operation related to machine learning.

The memory may include one or more computer readable storage media, where the computer readable storage media may be non-transient. The memory may further include a high-speed random access memory and a non-volatile memory, such as one or more magnetic disk storage devices or flash memory storage devices.

Optionally, the display apparatus may further include a peripheral device interface and at least one peripheral device. The processor, the memory, and the peripheral device interface may be connected by using a bus or a signal cable. All the peripheral devices may be connected to the peripheral device interface by using the bus, the signal cable, or the circuit board. Specifically, the peripheral device may include at least one of a radio frequency circuit, a camera, an audio circuit, a positioning component, and a power supply component.

The peripheral device interface may be configured to connect at least one peripheral device related to input/output (I/O) to the processor and the memory. In a feasible implementation, the processor, the memory, and the peripheral device interface are integrated on one chip or one circuit board. In another feasible implementation, any one or two of the processors, the memory, and the peripheral device interface may be implemented on a separate chip or a separate circuit board. This is not limited in this embodiment of this application.

The radio frequency circuit is configured to receive and transmit a radio frequency (RF) signal, which is also referred to as an electromagnetic signal. The radio frequency circuit communicates with a communications network and another communications device by using the electromagnetic signal. The radio frequency circuit converts an electrical signal into an electromagnetic signal for transmission, or the radio frequency circuit converts a received electromagnetic signal into an electrical signal. Optionally, the radio frequency circuit includes an antenna system, an RF transceiver, one or more amplifiers, a tuner, an oscillator, a digital signal processor, a codec chip set, a subscriber identity module card, and the like. The radio frequency circuit may communicate with another display apparatus by using at least one wireless communications protocol. The wireless communications protocol includes but is not limited to a world wide web, a metropolitan area network, an intranet, mobile communications networks of generations (2G, 3G, 4G, and 5G), a wireless local area network, and/or a wireless fidelity (Wi-Fi) network. Optionally, the radio frequency circuit may further include a circuit related to near field communication (NFC). This is not limited in this embodiment of this application.

The camera component is configured to collect an image or a video. Optionally, the camera component includes a front camera and a rear camera. Generally, the front camera is disposed in front of the display apparatus, and the rear camera is disposed at the rear of the display apparatus. Optionally, there are at least two rear cameras: a primary camera, and at least one of a depth camera, a wide-angle lens, and a long-focus camera, to implement a background blurring function implemented through fusion of the primary camera and the depth camera, and to implement a panoramic shooting function, a virtual reality (VR) shooting function, and another fusion shooting function implemented through fusion of the primary camera and the wide-angle camera. Optionally, the camera component may further include a flash. The flash may be a single-color temperature flash or a dual-color temperature flash. The dual-color temperature flash is a combination of a warm-light flash and a cold-light flash, and the dual-color temperature flash may be configured for light compensation at different color temperatures.

The audio circuit may include a microphone and a loudspeaker. The microphone is configured to collect a sound wave of a user and an environment, convert the sound wave into an electrical signal, and input the electrical signal to the processor for processing, or input the electrical signal to the radio frequency circuit to implement voice communication. For a purpose of stereo collection or noise reduction, there may be a plurality of microphones that are disposed at different parts of the display apparatus. The microphone may be an array microphone or an omnidirectional-acquisition microphone. The loudspeaker is configured to convert an electrical signal from the processor or the radio frequency circuit into a sound wave. The loudspeaker may be a conventional thin-film loudspeaker, or may be a piezoelectric ceramic loudspeaker. When the loudspeaker is the piezoelectric ceramic loudspeaker, an electrical signal may be converted into a sound wave audible to human being, and an electrical signal may be converted into a sound wave inaudible to human being for a ranging purpose. Optionally, the audio circuit may further include a headset jack.

The positioning component is configured to position a current geographical location of the display apparatus, to implement navigation or a location based service (LBS). The positioning component may be a positioning component based on a global positioning system (GPS) of the United States, a BeiDou system of China, or a Galileo system of Russia.

The power supply component is configured to supply power to the display panel 1. The power supply component may include a power input port connected to an external power supply, and/or a power supply battery. When the power supply component includes the power input port, the power input port may be disposed on a side face of the display panel. The power input port may be a universal serial bus (USB) interface. When the power supply component includes the power supply battery, the power supply battery may be disposed on a rear face (that is, a face that is away from the display panel 1 and that displays an image) of a specific sub-support plate. The power supply battery may be a lithium-ion battery.

Optionally, the display apparatus further includes one or more sensors. The one or more sensors include but are not limited to an acceleration sensor, a gyro sensor, a pressure sensor, a fingerprint sensor, an optical sensor, and a proximity sensor.

The acceleration sensor may detect acceleration magnitude on three coordinate axes of a coordinate system established by the display apparatus. For example, the acceleration sensor may be configured to detect components of a gravity acceleration on the three coordinate axes. The processor may control, based on a gravity acceleration signal collected by the acceleration sensor, the display panel 1 to display a user interface in a horizontal view or a vertical view. The acceleration sensor may be further configured to collect game data or motion data of a user.

The gyro sensor may detect a body direction and a rotation angle of the display apparatus, and the gyro sensor may collect, in collaboration with the acceleration sensor, a three-dimensional (3D) action performed by a user on the display apparatus. The processor may implement, based on data collected by the gyro sensor, the following functions: action sensing (for example, changing a user interface based on a tilt operation of the user), image stabilization during shooting, game control, and inertial navigation.

The pressure sensor may be disposed on a side frame of the display apparatus and/or a lower layer of the display panel 1. When the pressure sensor is disposed on the side frame of the display apparatus, the pressure sensor may detect a holding signal performed by a user for the display apparatus, and the processor performs, based on the holding signal collected by the pressure sensor, a right/left hand recognition or a shortcut operation. When the pressure sensor is disposed on the lower layer of the display panel 1, the processor controls, based on a pressure operation performed by the user on the display panel 1, an operability control on the user interface. The operability control includes at least one of a button control, a scroll bar control, an icon control, and a menu control.

The fingerprint sensor is configured to collect a fingerprint of a user, and the processor identifies an identity of the user based on the fingerprint collected by the fingerprint sensor or the fingerprint sensor identifies an identity of the user based on the fingerprint collected by the fingerprint sensor. When identifying that the identity of the user is a trustable identity, the processor authorizes the user to perform a related sensitive operation, where the sensitive operation includes unlocking a screen, viewing encrypted information, downloading software, making payment, changing a setting, and the like. The fingerprint sensor may be disposed on a front face, a rear face, or a side face of the display apparatus. When a physical button or a trademark (LOGO) of a manufacturer is disposed on the display apparatus, the fingerprint sensor may be integrated with the physical button or the trademark of the manufacturer.

The optical sensor is configured to collect ambient light intensity. For example, the processor may control display brightness of the display panel 1 based on the ambient light intensity collected by the optical sensor. Specifically, in a case of relatively high ambient light intensity, the display brightness of the display panel is increased; and in a case of relatively low ambient light intensity, the display brightness of the display panel 1 is decreased. For example, the processor may further dynamically adjust a shooting parameter of the camera component based on the ambient light intensity collected by the optical sensor.

The proximity sensor, also referred to as a distance sensor, is usually disposed on a front panel of the display apparatus. The proximity sensor is configured to collect a distance between a user and a front face of the display apparatus. For example, when the proximity sensor detects that the distance between the user and the front face of the display apparatus gradually decreases, the processor controls the display panel 1 to switch from a screen-on state to a screen-off state. When the proximity sensor detects that the distance between the user and the front face of the display apparatus gradually increases, the processor controls the display panel 1 to switch from the screen-off state to the screen-on state.

A person skilled in the art may understand that the foregoing structure does not constitute any limitation on the display apparatus. The display apparatus may include more or fewer components than the foregoing, or combine some components, or use a different component arrangement.

The display apparatus provided in this embodiment of this application may be a flexible display apparatus. The flexible display apparatus may be any product or component with a foldable display function, such as an electronic map, an electronic paper, a mobile phone, a tablet computer, a display screen, a notebook computer, or a wearable device.

Figure 15:
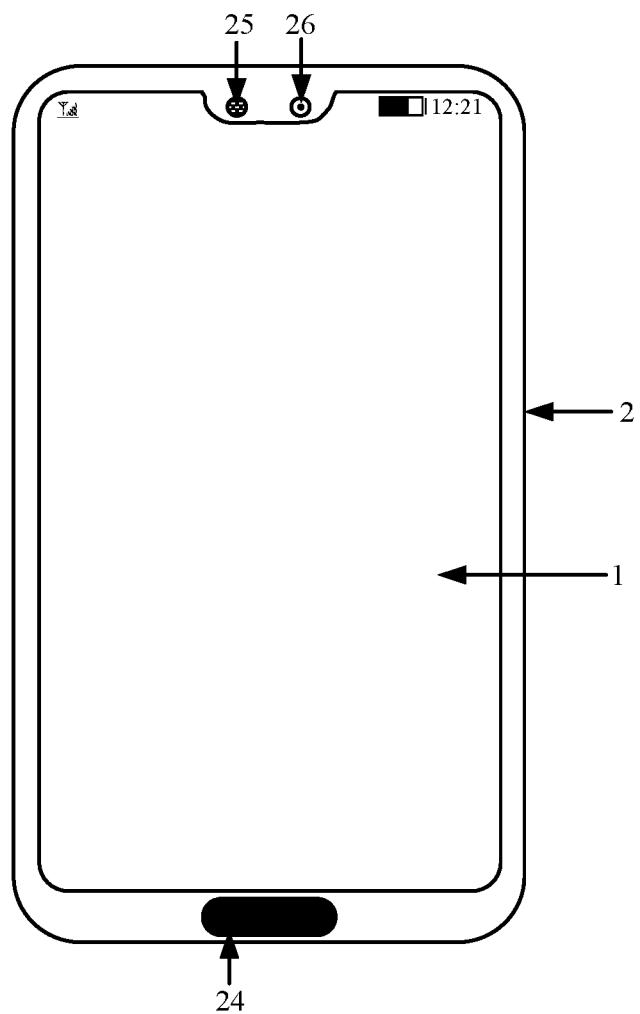
FIG. 15 is a schematic structural diagram of a mobile phone according to an embodiment of this application.

For example, FIG. 15 is a schematic structural diagram of a mobile phone according to an embodiment of this application. The mobile phone includes a display panel 1 and a foldable housing 2. A home key 24, an audio component 25, and a camera component 26 are disposed on the foldable housing 2, where the audio component 25 may be a loudspeaker. It should be noted that a camera component may be further disposed on a face that is of the mobile phone and that is opposite to the display panel 1, and a power input interface may be further disposed on a side face of the mobile phone. Details are not described herein in this embodiment of this application.

In conclusion, in the display apparatus provided in the embodiments of this application, when the flexible display cover plate receives external force, both the first cover-plate layer and the auxiliary protective layer can absorb and diffuse impact of the external force, so that the external force received by the display substrate is reduced, and damage caused by the external force to the display substrate is reduced, thereby improving a protection effect provided for the display substrate. In addition, when the flexible display cover plate is folded, the bonding layer expands to edges of the flexible display cover plate due to deformation, so that changes of the first cover-plate layer and the second cover-plate layer are reduced in a tensile modulus and a thickness during folding, and rigidness of the flexible display cover plate at a same bending radius is increased, thereby improving the protection effect provided for the display substrate.

It may be clearly understood by a person skilled in the art that, for ease of convenience and conciseness, and for a specific structure of the flexible display cover plate in the foregoing flexible display apparatus, refer to the structure of the flexible display cover plate in the foregoing embodiments. Details are not described herein again in the embodiments of this application.

The term "and/or" in this application describes only an association relationship for describing associated objects and represents that there may be three relationships. For example, A and/or B may represent the following three cases: only A exists, both A and B exist, and only B exists.

The foregoing descriptions are merely specific implementations of this application, but are not intended to limit a protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A flexible display cover plate, comprising:
a first cover-plate layer; and
at least one auxiliary protective layer that is disposed on a face of the first cover-plate layer, wherein
the auxiliary protective layer comprises a bonding layer and a second cover-plate layer that are superimposed along a direction away from the first cover-plate layer, wherein the bonding layer is a deformable film layer, and an outermost face of the second cover-plate layer in the at least one auxiliary protective layer that is furthest away from the bonding layer is used to attach to a display substrate;
wherein
an orthographic projection region on the first cover-plate layer of the second cover-plate layer is located inside a region enclosed by edges of the first cover-plate layer; an annular region is enclosed by the edges of the first cover-plate layer and edges of the orthographic projection on the first cover-plate layer of the second cover-plate layer;
and wherein
the auxiliary protective layer further comprises a transparent filling material filled in a gap enclosed by a side face of the second cover-plate layer and a face of the bonding layer and that faces the second cover-plate layer.

2. The flexible display cover plate according to claim 1, wherein
at least one of the first cover-plate layer and the second cover-plate layer comprise an ultra-thin glass, wherein a thickness of the ultra-thin glass is from 0.01 mm to 0.2 mm.

3. The flexible display cover plate according to claim 2, wherein
the first cover-plate layer comprises the ultra-thin glass and a protective coating layer disposed on a face of the ultra-thin glass and that is close to the second cover-plate layer.

4. The flexible display cover plate according to claim 2, wherein the second cover-plate layer comprises the ultra-thin glass and a protective coating layer that is disposed on at least one face of the ultra-thin glass.

5. The flexible display cover plate according to claim 1, wherein
the transparent filling material is a flexible thin-film material or an optical clear adhesive material.

6. The flexible display cover plate according to claim 1, wherein
at least one of the first cover-plate layer and the second cover-plate layer comprise at least one of a flexible thin film, a thickness of the flexible thin film is from 0.01 mm to 0.2 mm, and a light transmittance of the flexible thin film is greater than or equal to 85%.

7. The flexible display cover plate according to claim 6, wherein
the first cover-plate layer comprises the flexible thin film and a hardened coating layer disposed on a face of the flexible thin film and that is away from the second cover-plate layer, wherein a thickness of the hardened coating layer is at least one of from 0.1 μm to 100 μm, and a pencil hardness of the hardened coating layer is greater than or equal to 2H.

8. The flexible display cover plate according to claim 1, wherein
the bonding layer meets at least one of the following conditions:

a thickness of the bonding layer is from 0.005 mm to 0.2 mm;

a modulus of the bonding layer is less than or equal to 0.2 MPa; and a material of the bonding layer is the optical clear adhesive material.

9. The flexible display cover plate according to claim 1, wherein the material of the bonding layer is optical clear adhesive OCA or ultraviolet UV adhesive.

10. The flexible display cover plate according to claim 1, wherein the at least one auxiliary protective layer comprises a plurality of superimposed auxiliary protective layers.

11. A display panel, comprising a flexible display cover plate; and a display substrate, wherein the flexible display cover plate is the flexible display cover plate comprising:

a first cover-plate layer; and at least one auxiliary protective layer that is disposed on a face of the first cover-plate layer, wherein the auxiliary protective layer comprises a bonding layer and a second cover-plate layer that are superimposed along a direction away from the first cover-plate layer, wherein the bonding layer is a deformable film layer, and an outermost face of the second cover-plate layer in the at least one auxiliary protective layer that is furthest away from the bonding layer is used to attach to a display substrate;

wherein an orthographic projection region on the first cover-plate layer of the second cover-plate layer is located inside a region enclosed by edges of the first cover-plate layer; an annular region is enclosed by the edges of the first cover-plate layer and edges of the orthographic projection on the first cover-plate layer of the second cover-plate layer;

and wherein the auxiliary protective layer further comprises a transparent filling material filled in a gap enclosed by a side face of the second cover-plate layer and a face of the bonding layer and that faces the second cover-plate layer; and wherein the flexible display cover plate is disposed on the display substrate, and a face of a second cover-plate layer and that is away from a first cover-plate layer is attached to the display substrate.

12. A display apparatus, comprising a display panel and a foldable housing, wherein the display panel is the display panel comprises:

a flexible display cover plate; and a display substrate, wherein the flexible display cover plate is the flexible display cover plate comprising:

a first cover-plate layer; and at least one auxiliary protective layer that is disposed on a face of the first cover-plate layer, wherein the auxiliary protective layer comprises a bonding layer and a second cover-plate layer that are superimposed along a direction away from the first cover-plate layer, wherein the bonding layer is a deformable film layer, and an outermost face of the second cover-plate layer in the at least one auxiliary protective layer that is furthest away from the bonding layer is used to attach to a display substrate; and wherein the flexible display cover plate is disposed on the display substrate, and a face of a second cover-plate layer and that is away from a first cover-plate layer is attached to the display substrate; wherein an orthographic projection region on the first cover-plate layer of the second cover-plate layer is located inside a region enclosed by edges of the first cover-plate layer; an annular region is enclosed by the edges of the first cover-plate layer and edges of the orthographic projection on the first cover-plate layer of the second cover-plate layer;

and wherein the auxiliary protective layer further comprises a transparent filling material filled in a gap enclosed by a side face of the second cover-plate layer and a face of the bonding layer and that faces the second cover-plate layer; and wherein the foldable housing has a cavity with an opening on one face, and the display panel is accommodated into the cavity by using the opening, and is fixedly connected to an inner wall of the cavity.

13. The display apparatus according to claim 12, wherein the foldable housing comprises a first sub-housing, a second sub-housing, and a hinge, wherein the first sub-housing and the second sub-housing are moveably connected by using the hinge to enclose the cavity, and some of edges of the flexible display cover plate are fixedly connected to the first sub-housing, and the other of the edges are fixedly connected to the second sub-housing.

14. The display apparatus according to claim 13, wherein both the flexible display cover plate and the display substrate are in a rectangular shape, the edges of the flexible display cover plate are respectively parallel to edges of the display substrate, at least two opposite edges of the flexible display cover plate protrude from the edges of the display substrate, and some of the at least two opposite edges on a face that is of the flexible display cover plate and that faces the display substrate are glued to the first sub-housing, and the other of the at least two opposite edges are glued to the second sub-housing.

* * * * *